United States Patent [19]

Kita

[11] Patent Number: 5,324,551
[45] Date of Patent: Jun. 28, 1994

[54] SLIDABLE CERAMIC MEMBER AND METHOD OF MANUFACTURING SAME

[75] Inventor: Hideki Kita, Fujisawa, Japan

[73] Assignee: Isuzu Ceramics Research Institute Company, Ltd., Japan

[21] Appl. No.: 992,777

[22] Filed: Dec. 18, 1992

Related U.S. Application Data

[62] Division of Ser. No. 638,312, Jan. 7, 1991, Pat. No. 5,238,626, which is a division of Ser. No. 426,151, Oct. 24, 1989, Pat. No. 5,164,266.

[51] Int. Cl.$^5$ .................. C04B 35/56; B04B 35/58
[52] U.S. Cl. .................. 427/527; 427/397.7; 427/530; 427/531
[58] Field of Search ............. 427/527, 530, 531, 397.7

[56] References Cited

U.S. PATENT DOCUMENTS

| | | | |
|---|---|---|---|
| 3,711,171 | 1/1973 | Orkin et al. | 308/241 |
| 3,755,164 | 8/1973 | Van Nyk | 252/12 |
| 3,883,147 | 5/1975 | Tray et al. | 252/12 |
| 3,923,667 | 12/1975 | Lachman | 252/12 |
| 3,953,343 | 4/1976 | Sliney | 252/12 |
| 3,954,479 | 5/1976 | Jahn | 252/12 |
| 4,088,799 | 5/1978 | Kurtin | 427/527 |
| 4,136,211 | 1/1979 | Sliney | 252/12.2 |
| 4,256,489 | 3/1981 | Van Wyk | 252/12 |
| 4,499,147 | 2/1985 | Enomoto et al. | 428/446 |
| 4,678,678 | 7/1987 | Kamigaito | 427/527 |
| 4,745,022 | 5/1988 | Miyake et al. | 428/698 |
| 4,775,548 | 10/1988 | Lankford | 427/527 |
| 4,804,589 | 2/1989 | Matsui et al. | 428/699 |
| 4,816,349 | 3/1989 | Matsui et al. | 428/698 |
| 4,871,266 | 10/1989 | Oda | 384/463 |
| 4,934,837 | 6/1990 | Kanamura | 384/463 |
| 4,952,454 | 8/1990 | Iwamoto et al. | 428/697 |

*Primary Examiner*—James Derrington
*Attorney, Agent, or Firm*—Staas & Halsey

[57] ABSTRACT

A slidable ceramic member includes a base of a sintered ceramic material which is a compound including silicon (Si) as a constituent element, the base having a sliding surface, and a coated layer covering the sliding surface of the base, the coated layer comprising a compound of elements, such as barium (Ba) and calcium (Ca), belonging to group IIa of the periodic table, silicon (Si), and oxygen (O). The slidable ceramic member is used as a slidable component of a heat engine such as a cylinder liner or a piston ring which is subjected to repeated thermal stresses. Such a slidable ceramic member is manufactured by placing powder of a fluoride including elements belonging to group IIa of the periodic table on a surface of a base, and heating the base while rubbing the powder against the surface of the base, whereby the silicon (Si) contained in the base and the group-IIa elements contained in the powder can react with each other, thereby forming a slidable layer on the surface of the base.

4 Claims, 5 Drawing Sheets

FIG. 5

| | ADHESION TO BASE | COATED LAYER THICKNESS UNIFORMITY |
|---|---|---|
| SAMPLE 1 | GOOD | GOOD |
| SAMPLE 2 | GOOD | GOOD |
| SAMPLE 3 | POOR (PEELED OFF AT 300° C.) | GOOD |
| SAMPLE 4 | GOOD | POOR |

SLIDABLE CERAMIC MEMBER AND METHOD OF MANUFACTURING SAME

This application is a division of application Ser. No. 07/638,312, filed Jan. 7, 1991, now U.S. Pat. No. 5,238,626, which is a division of application Ser. No. 07/426,151, filed Oct. 24, 1989, now U.S. Pat. No. 5,164,266.

BACKGROUND OF THE INVENTION

1. Field of the Invention

The present invention relates to a slidable ceramic member having a sliding surface covered with a solid lubricant and a method of manufacturing such a slidable ceramic member.

2. Description of the Prior Art

It is known that the sliding characteristics of a sliding surface can be improved by covering the sliding surface with a solid lubricant such as calcium fluoride ($CaF_2$) or barium fluoride ($BaF_2$).

Such a solid lubricant may be coated by the well known plasma spray coating process. The solid lubricant may also be coated by another coating process as disclosed in page 143 and following pages of *Solid Lubrication Handbook* published by Saiwai Shobou.

According to the disclosed coating process, a slidable member made of a nickel alloy is heated to oxidize the sliding surface, thus forming an oxide layer thereon. Then, a kneaded mixture of an inorganic binder of $CoO$-$B_2O_3$-$BaO$ and calcium fluoride ($CaF_2$) is sprayed on the sliding surface which is cooled to 150° C. Thereafter, the sliding surface is heated again to 1090° C. to fire the coated kneaded mixture on the sliding surface.

If a sliding surface of a ceramic member made of silicon nitride ($Si_3N_4$) or silicon carbide (SiC) is coated with calcium fluoride ($CaF_2$) by the plasma spray process, then the coated layer of calcium fluoride ($CaF_2$) may subsequently be peeled off the sliding surface due to a temperature change after the spray coating process because of the different coefficients of thermal expansion of silicon nitride ($Si_3N_4$) or silicon carbide (SiC) and calcium fluoride ($CaF_2$).

The coating process disclosed in the aforesaid literature is problematic in that since an inorganic binder is used, the proportion of calcium fluoride ($CaF_2$) in the coated surface layer is small, and hence the sliding characteristics of the coated surface layer are poorer than a coated surface layer made of only calcium fluoride ($CaF_2$).

SUMMARY OF THE INVENTION

In view of the aforesaid problems of conventional slidable ceramic members, it is an object of the present invention to provide a slidable ceramic member including a base of a ceramic material which has a sliding surface firmly coated with a solid lubricant layer without the use of any binder, and a method of manufacturing such a slidable ceramic member.

According to the present invention, a surface of a base of a sintered ceramic material which is a compound including silicon (Si) as a constituent element is firmly coated with a coated layer comprising a compound of at least one element belonging to group IIa of the periodic table, silicon (Si), and oxygen (O).

According to a method of manufacturing such a slidable ceramic member, powder of a fluoride including at least one element belonging to group IIa of the periodic table is placed on a sliding surface of a base, and the base with the fluoride powder placed thereon is heated, so that the base and the fluoride powder are caused to thermally react with each other. Then, while keeping the base heated, a pressing surface is pressed against the sliding surface of the base, and the pressing surface and the sliding surface are rubbed against each other for a predetermined period of time. The base and the fluoride powder are therefore held in contact with each other over an increased area, thus accelerating the thermal reaction therebetween. The sliding surface of the base has many microscopic surface irregularities which have resulted from removal of ceramic particles from the sintered ceramic material. Upon sliding movement of the pressing and sliding surfaces against each other, however, the fluoride powder enters the concavities in the sliding surface, with the result that the coated layer is more intimately bonded to the base.

According to another method of manufacturing a slidable ceramic member, a base of a ceramic material which is a compound including silicon (Si) as a constituent element is heated in a vacuum atmosphere, and ions of at least one element belonging to group IIa of the periodic table are accelerated and applied to a sliding surface of the base. The applied ions are implanted and diffused in the base.

The ceramic material of the base comprises silicon nitride ($Si_3N_4$), or silicon carbide (SiC), or their mixture, for example. The element belonging to group IIa is barium (Ba) or calcium (Ca), for example.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a table of the results of tests conducted on the samples for coated layer adhesion and coated layer thickness uniformity;

DETAILED DESCRIPTION OF THE PREFERRED EMBODIMENTS

Figure 1:
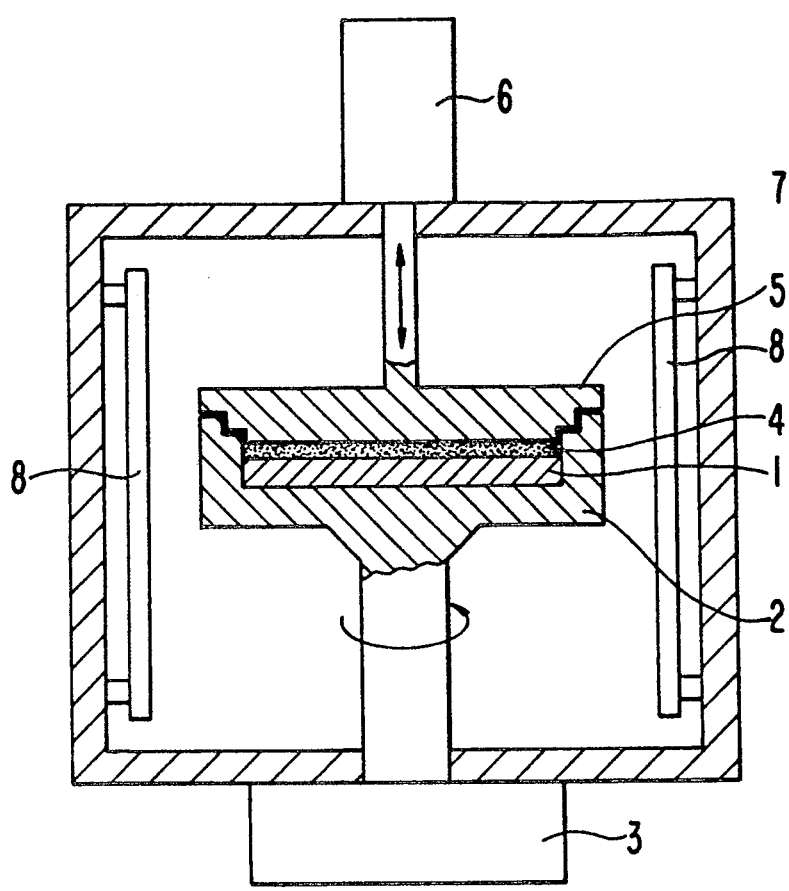
FIG. 1 is a cross-sectional view of an apparatus for carrying out a method of the present invention.

FIG. 1 shows an apparatus for carrying out a method of manufacturing a slidable ceramic member.

A base 1 is made of a ceramic material which is a compound including silicon (Si) as one of its constituents. The base 1 is held in position by a heat-resistant holder 2 coupled to a rotating mechanism 3. Therefore, the base 1 and the holder 2 are rotatable in unison by the rotating mechanism 3.

A powder mass 4 of a fluoride is placed on the base 1, and confined in place by a cover 5 fitted in the holder 2. The cover 5 is forced by a pressing mechanism 6 to press a sliding surface of the base 1 and also to prevent the powder mass 4 from being scattered around.

The holder 2 and the cover 5 are disposed in a heating furnace 7 with a heater 8 housed therein. The heater 8 heats the base 1 and the powder mass 4 up to a predetermined temperature.

The base 1 is in the form of a disc made of sintered silicon nitride ($Si_3N_4$), the disc having a diameter of 100 mm and a thickness of 10 mm. The upper surface of the base 1 serves as the sliding surface and has a center-line mean roughness Ra of 0.5 $\mu$m. The sintered-disc has a relative density of 99%.

The powder mass 4 placed on the sliding surface of the base 1 comprises a powder mass of calcium fluoride ($CaF_2$) having an average particle diameter of about 1 $\mu$m. After the powder mass 4 is placed on its base 1, the cover 5 is lowered to confine the powder mass 4 in position so that the powder mass 4 will not be scattered around during rotation. At this stage, however, the cover 5 is held in contact with the powder mass 4, but is not pressed down strongly enough to press the sliding surface of the base 1.

Then, the heater 8 is energized to heat the interior space of the heating furnace 7 until the base 1 and the powder mass 4 are heated up to 800° C. The base 1 and the powder mass 4 then remain heated to that temperature for 1 hour.

The pressing mechanism 6 is operated to exert a surface pressure of 0.02 MPa on the sliding surface of the base 1, and the rotating mechanism 3 is operated to rotate the base 1 at the speed of 600 rpm for 1 hour.

Thereafter, the base 1 is stopped and the surface pressure is released, and then base 1 is cooled down to room temperature. A sample 1 is thus prepared.

A sample 2 is prepared in the same process as described above except that the base 1 is made of sintered silicon carbide (SiC) and the powder mass 4 is in the form of a powder mixture of calcium fluoride ($CaF_2$) and barium fluoride ($BaF_2$), these elements being mixed at a volume ratio of 1:1.

For comparison with the samples 1 and 2 thus prepared, another sample 3 is prepared by coating the surface of a base of silicon nitride ($Si_3N_4$) with powder of calcium fluoride ($CaF_2$) having an average particle diameter according to the plasma spray coating process.

Furthermore, a sample 4 is prepared by coating the surface of a base of sintered silicon nitride ($Si_3N_4$) with a paste comprising a kneaded mixture of calcium fluoride ($CaF_2$) and aluminum oxide ($Al_2O_3$) which is a sintering assistant for silicon carbide, and the firing the coated base at 1300° C.

Figure 2:
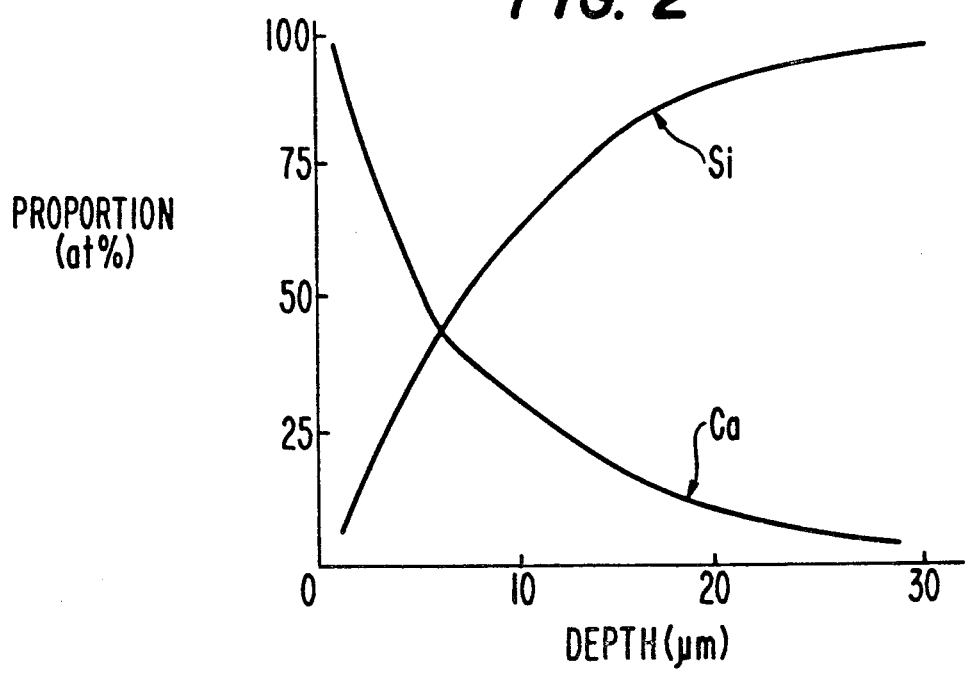
FIG. 2 is a graph showing how the proportions of the elements silicon (Si) and calcium (Ca) vary with the depth of a slidable ceramic member.

On the sliding surface of the sample 1, there has grown a compound of Ca-Si-O ($Ca_8Si_5O_{18}$). The proportions of the elements silicon (Si) and calcium (Ca) gradually vary from the sliding surface into the inner structure of the sample 1 as shown in FIG. 2. Therefore, the layer of calcium fluoride ($CaF_2$) covering the sliding surface and the sintered base of silicone nitride ($Si_3N_4$) are firmly bonded together.

Figure 3:
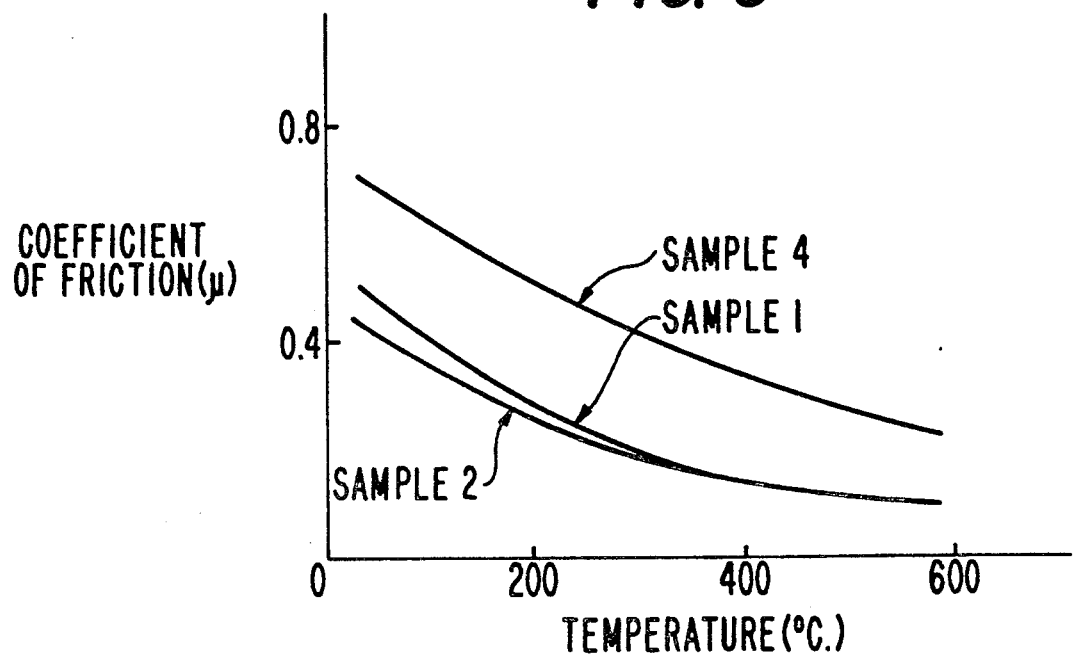
FIG. 3 is a graph showing the measured coefficients of friction of samples at different temperatures.
Figure 4:
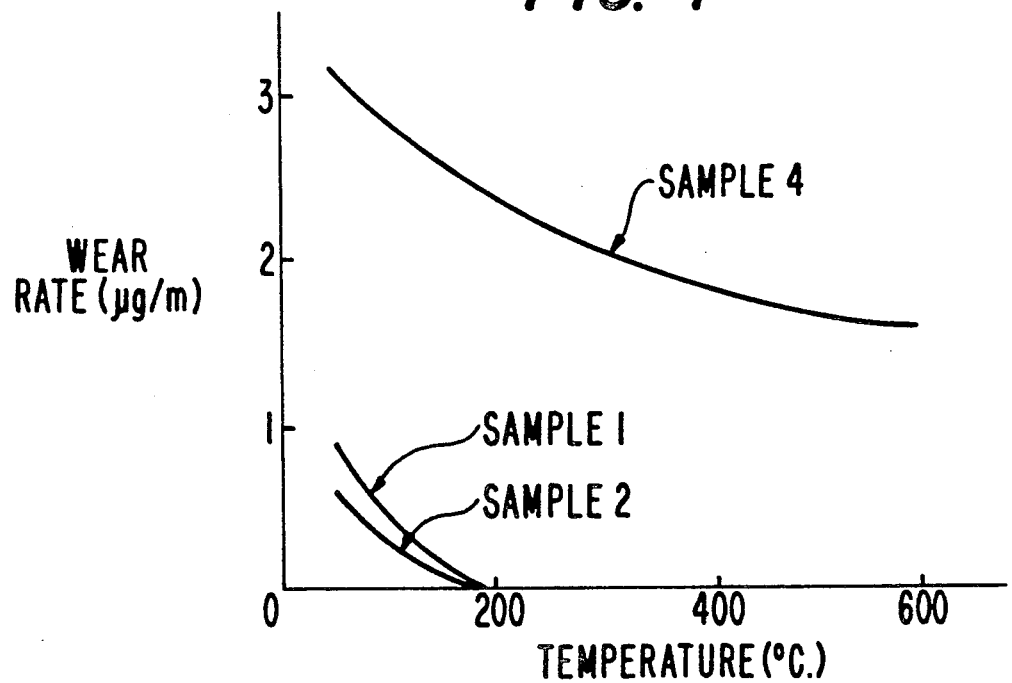
FIG. 4 is a graph showing the measured wear rates of the samples at different temperatures.

FIG. 3 shows the temperature-dependent coefficients of friction of the samples 1, 2, and 4, and FIG. 4 shows the temperature-dependent wear rates of the samples 1, 2, and 4. As seen from FIGS. 3 and 4, the coefficients of friction and the wear rates of the samples 1, 2 according to the present invention are lower than those of the sample 4 which is prepared by a conventional process.

The samples 1, 2, 3, and 4 were subjected to a thermal cycle test in which they were cyclically heated and cooled between room temperature and 400° C., to see whether the coated layers were peeled off or not. The samples 1, 2, 3, and 4 were also tested for coated layer thickness uniformity. The results of these tests are shown in FIG. 5.

FIG. 5 clearly indicates that the coated layer of conventionally prepared sample 3 was peeled off the base when it was heated to 300° C., and the thickness of the coated layer of sample 4 was irregular, whereas the coated layers of the samples 1, 2 were intimately bonded to the bases and had a uniform thickness.

Figure 6:
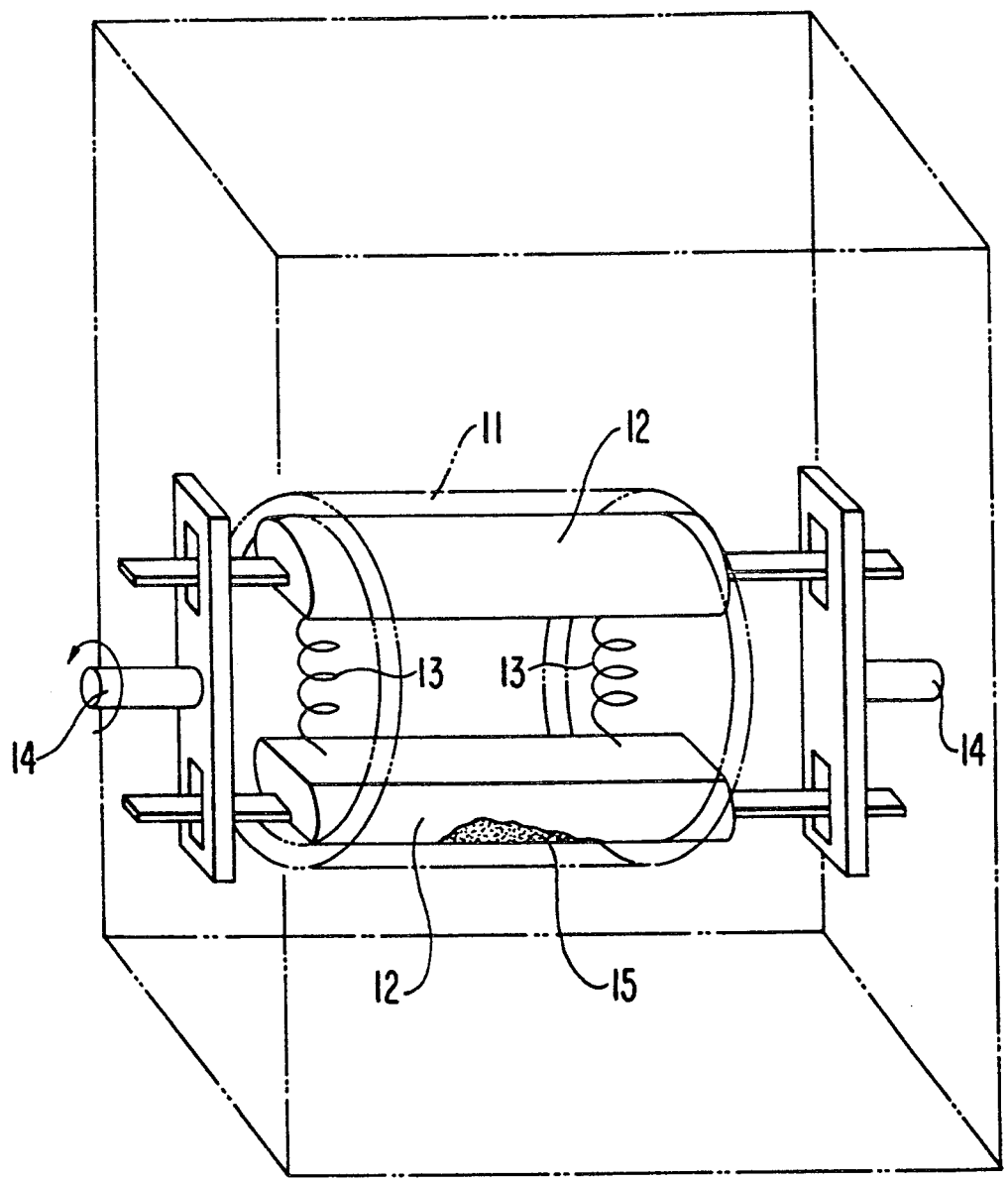
FIG. 6 is a perspective view of an apparatus for applying a coating layer to a cylindrical inner wall surface.
Figure 7:
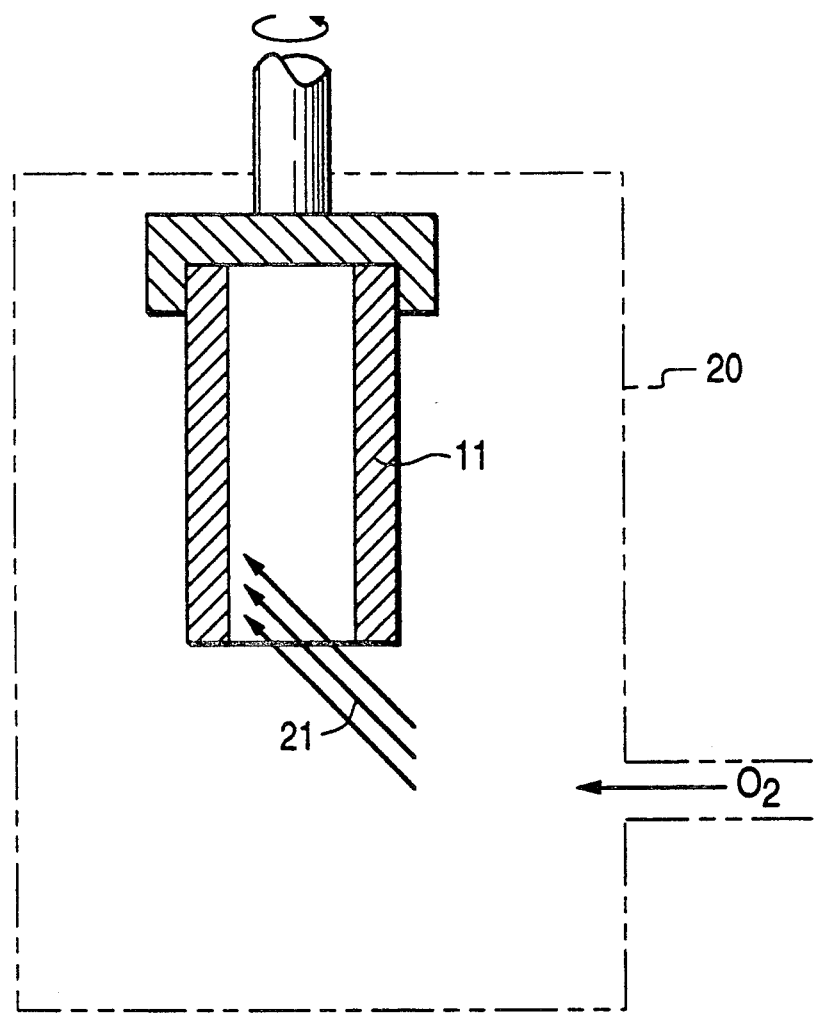
FIG. 7 is a cross-sectional view of another embodiment of an apparatus for carrying out a method of the present invention.

FIG. 6 schematically shows an apparatus for applying a coated layer to a cylindrical inner wall surface such as the inner wall surface of an engine cylinder sleeve, for example.

Two pressers 12 are pressed against an inner wall surface of a cylindrical base 11 under the resilient forces of springs 13 acting between the pressers 12. The pressers 12 are rotatable by and about shafts 14. Therefore, when the shafts 14 are rotated by a motor or the like (not shown) coupled thereto, the pressers 12 are rotated while being slidably held against the inner wall surface of the base 11. The apparatus shown in FIG. 6 is placed in a heating furnace (not shown) similar to the heating furnace 7 shown in FIG. 1.

The apparatus illustrated in FIG. 6 operates as follows: After a powder mass 15 of a fluoride is placed on the inner wall surface of the base 11 the shafts 14 are rotated and the interior space of the heating furnace is heated up to 800° C. The powder mass 15 is now spread all over the inner wall surface of the base 11 by the pressers 12 and thermally reacts with the base 11, producing a coated layer having the same composition as the sample 1 or 2, for example, on the inner wall surface of the base 11.

Another manufacturing process will be described below. The cylindrical base 11 is placed in an evacuated heating furnace 20, and an ion beam 21 composed of ions of at least one of the elements belonging to the group IIa of the periodic table is applied to the sliding surface of the base. The applied ions are then implanted into base. Thereafter, the base is heated up to 800° C. and an oxygen gas ($O_2$) is introduced into the evacuated heating furnace. The element which has been applied to the sliding surface of the base and implanted into the base, such as calcium (Ca), and silicon (Si) which is one of the constituent elements of the base are caused to react with the introduced oxygen (O), thereby forming a compound of Ca-Si-O.

In the above description, the base is heated to 800° C. in the heating furnace. However, the inventor has confirmed that the ceramic material of the base and the fluoride of the coated layer start to react with each other above 700° C. and do not react with each other below 700° C.

Although certain preferred embodiments have been shown and described, it should be understood that many changes and modifications may be made therein without departing from the scope of the appended claims.

What is claimed is:

1. A method of manufacturing a slidable ceramic member, comprising the steps of:

implanting at least one element belonging to group IIa of the periodic table into a base including silicon by applying an ion beam including ions of said at least one element to a sliding surface of said base; and thermally reacting said base, in an oxygen containing atmosphere, with said at least one element and oxygen to form a compound by heating said base with said at least one element implanted therein up to a predetermined temperature.

2. A method according to claim 1, wherein said base is cylindrical.

3. A method according to claim 1, wherein said predetermined temperature is 800° C.

4. A method according to claim 1, wherein said step of thermally reacting said base with said at least one element includes the substep of:

forming a compound including Ca-Si-O on said sliding surface.

* * * * *

UNITED STATES PATENT AND TRADEMARK OFFICE
CERTIFICATE OF CORRECTION

PATENT NO. : 5,324,551
DATED :
INVENTOR(S) : June 28, 1994

Hideki KITA

It is certified that error appears in the above-indentified patent and that said Letters Patent is hereby corrected as shown below:

On the title page:

Item [56]    References Cited, line 2, "Van Nyk" should be --Van Wyk--.

Column 1, line 33, after "C" delete ".".

Column 3, line 19, delete "its" and insert --the--.

Column 4, line 5, after "C" delete ".";

line 12, after "C" delete ".";

line 32, after "11" insert --,--;

line 46, after "into" insert --the--; and line 54, after "C" delete ".".

Signed and Sealed this

Fourteenth Day of March, 1995

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,324,551
DATED : June 28, 1994
INVENTOR(S) : Hideki Kita

It is certified that error appears in the above-indentified patent and that said Letters Patent is hereby corrected as shown below:

Item
[56] Title Page, References Cited, line 2, "Van Nyk" should be --Van Wyk--.
Col. 1, line 33, after "C" delete ".".
Col. 3, line 19, delete "its" and insert --the--.
Col. 4, line 5, after "C" delete ".";
    line 12, after "C" delete ".";
    line 32, after "11" insert --,--;
    line 46, after "into" insert --the--; and
    line 54, after "C" delete ".".
Col. 5, line 5, after "base" delete the extra space therein.

This certificate supersedes Certificate of Correction Issued March 14, 1995.

Signed and Sealed this

Sixth Day of June, 1995

Attest:

BRUCE LEHMAN

*Attesting Officer*  *Commissioner of Patents and Trademarks*